US010628366B2

(12) United States Patent
Hartman

(10) Patent No.: US 10,628,366 B2
(45) Date of Patent: Apr. 21, 2020

(54) METHOD AND SYSTEM FOR A FLEXIBLE INTERCONNECT MEDIA IN A POINT-TO-POINT TOPOGRAPHY

(71) Applicant: DELL PRODUCTS, L.P., Round Rock, TX (US)

(72) Inventor: Corey Dean Hartman, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 438 days.

(21) Appl. No.: 14/554,040

(22) Filed: Nov. 26, 2014

(65) Prior Publication Data

US 2016/0147699 A1    May 26, 2016

(51) Int. Cl.
G06F 13/40    (2006.01)
G06F 13/42    (2006.01)

(52) U.S. Cl.
CPC ...... G06F 13/4081 (2013.01); G06F 13/4221 (2013.01)

(58) Field of Classification Search
None
See application file for complete search history.

(56) References Cited

U.S. PATENT DOCUMENTS

| | | | | |
|---|---|---|---|---|
| 2007/0089446 A1* | 4/2007 | Larson | ............... | G05D 23/1931 62/259.2 |
| 2009/0077295 A1* | 3/2009 | Konno | ............... | G06F 13/4068 710/301 |
| 2013/0128464 A1* | 5/2013 | Chen | ............... | H05K 7/026 361/721 |
| 2013/0170138 A1* | 7/2013 | Fujii | ............... | H05K 7/20145 361/695 |
| 2014/0122767 A1* | 5/2014 | Hershko | ............... | G06F 13/405 710/313 |
| 2015/0347345 A1* | 12/2015 | Hellriegel | ............... | G06F 13/409 710/301 |
| 2016/0026589 A1* | 1/2016 | Kolor | ............... | G06F 13/4221 710/313 |
| 2016/0154761 A9* | 6/2016 | Reinke | ............... | G06F 1/185 710/301 |
| 2016/0203100 A1* | 7/2016 | Arroyo | ............... | G06F 13/4282 714/5.1 |
| 2016/0261067 A1* | 9/2016 | Soubh | ............... | H01R 12/724 |
| 2017/0160775 A1* | 6/2017 | Sun | ............... | G06F 1/20 |

FOREIGN PATENT DOCUMENTS

KR    20120114493 A   * 10/2012

\* cited by examiner

*Primary Examiner* — Ilwoo Park
(74) *Attorney, Agent, or Firm* — Isidore PLLC

(57) ABSTRACT

A method and an information handling system provide flexible interconnections between two endpoints and in particular to allow for the allocation and reallocation of PCI lanes. A flexible interconnect media system is capable of connecting a CPU to an I/O device. The flexible interconnect media system includes I/O slots that are each capable of receiving an I/O device, connection interfaces each correlated with an I/O slot, link taps with correlated ports for each CPU, and flexible interconnect media capable of connecting an open connection interface with an open link tap, whereby a connection between the CPU and the I/O device is completed.

18 Claims, 11 Drawing Sheets

400

400

400

700

800

METHOD AND SYSTEM FOR A FLEXIBLE INTERCONNECT MEDIA IN A POINT-TO-POINT TOPOGRAPHY

BACKGROUND

1. Technical Field

The present disclosure generally relates to information handling systems and in more specifically to flexible interconnections between two endpoints in an information handling system. Still more particularly, the present disclosure relates to the allocation and reallocation of peripheral component interconnect (PCI) lanes of a PCI connector.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (IHS) typically includes different types of interconnects that enable interconnection for data and/or signal transfer between two end points or devices. PCI and PCI Express (PCIe) are two such interconnect standard that can be utilized in some IHSes. PCI/PCIe is a bidirectional, point-to-point serial interconnect standard that is capable of high bandwidth data transfers up to 32 GB/s on an x16 connector. PCIe serves as a general purpose I/O interconnect for a wide variety of computing and communication platforms. The PCIe provides high speed, low pin count, and point-to-point transfers. A PCI Express link has two low-voltage, differential pairs of signals, a transmitting differential pair and a receiving differential pair. The bandwidth of a PCI Express link may be linearly scaled by adding differential pairs to form multiple lanes. The PCI Express currently supports from 1 to 32 lanes denoted as x1, x2, x4, x8, x16, or x32 lanes wherein each byte is transmitted with encoding across the lanes.

PCIe is based on point-to-point topology, with separate serial links connecting every device to the host with PCI Express port. The PCIe link supports full duplex communication between any two endpoints, with concurrent access across multiple endpoints. This configuration makes PCIe not interchangeable. The interconnection from the host, such as a CPU designated port, to a PCI Express slot is hardwired in the printed board circuit (PBC). A typical server allocates PCI lanes designed to a certain endpoint, and the PCI lanes cannot be reallocated. In a dense and high performance environment with multiple CPUs and high density of end points, the limit of PCI ports with certain bandwidth on the CPU to certain endpoints leads to a decrease in potential performance.

BRIEF SUMMARY

Disclosed are a method, a system, and an information handling system with flexible interconnections between a designated PCIe port and an I/O slot.

According to an example embodiment of the present disclosure, an information handling system includes central processing units (CPUs), each CPU having several designated ports for input/output (I/O) device interconnects. The interconnection between a CPU and an I/O device comprises a flexible interconnect media system. The flexible interconnect media system includes independent connection interfaces with correlated I/O slots, link taps with assigned designated ports, and flexible interconnect media for connecting an open connection interface with an open link tap, which completes the interconnection between the CPU and the I/O device. Each connection interface is connected to a correlated I/O slot. Each link tap is connected to an assigned designated port. The flexible interconnect completes the electrical connection from the CPU to the designated port to the open link tap to the open connection interface to the correlated I/O slot to the I/O device. The utilization of the flexible interconnect media system allows a designated port to connect from the correlated link tap to any open I/O slot via the flexible interconnect media.

The link taps are centrally located and are connectable to an I/O slot with a flexible interconnect media. The connection interfaces include a programmable switch that allows sharing of one designated port with multiple I/O slots. The flexible interconnect media may include differential signal pairs, sideband signals, and power supply lines The correlated I/O slot is connectable to the differential signal pairs, sideband signals, and system power through the flexible interconnect media.

According to another specific embodiment of the present invention, an information handling system may include flexible interconnect media that has an interconnect identification for identifying a power consumption characteristic, a cooling requirement, and type of I/O device inserted into the correlated I/O slot. And each I/O slot has a unique slot identification that at least identifies the type of I/O devices that can be inserted, bandwidth connections, a location of the I/O slot, and maximum cooling capability of the location. A firmware in the information handling system may detect an identification of the I/O slot and an identification of the flexible interconnect media, determine the I/O device that can be coupled to the I/O slot, keep track of system inventory, and determine power requirements and cooling requirements of the I/O device. The firmware includes a lookup data structure having operating characteristics associated with all combinations of PCI devices that can be coupled to the flexible interconnect media. PCI devices may have different bandwidths. The designated ports have variable bandwidths and are compatible with at least one I/O interface standard, including PCI and PCIe. Each I/O slot is capable of receiving different types of I/O devices having variable sizes in length and width, different power characteristics (e.g., high or low power), and different bandwidths.

According to another specific embodiment of the present invention, an information handling system may include some I/O slots and correlated connection interfaces located outside of the information handling system. The flexible interconnect media provides an interconnection from the information handling system to a separate remote chassis with independent physical characteristics such as cooling requirements and power requirements.

According to another specific embodiment of the present invention, the flexible interconnect media may include a riser that is utilized to make connections to the link tap, a mechanical bracket structure that is utilized to anchor the flexible interconnect media to a chassis, and a cable that carries differential signal pairs, sideband signals, and power to the I/O slot.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
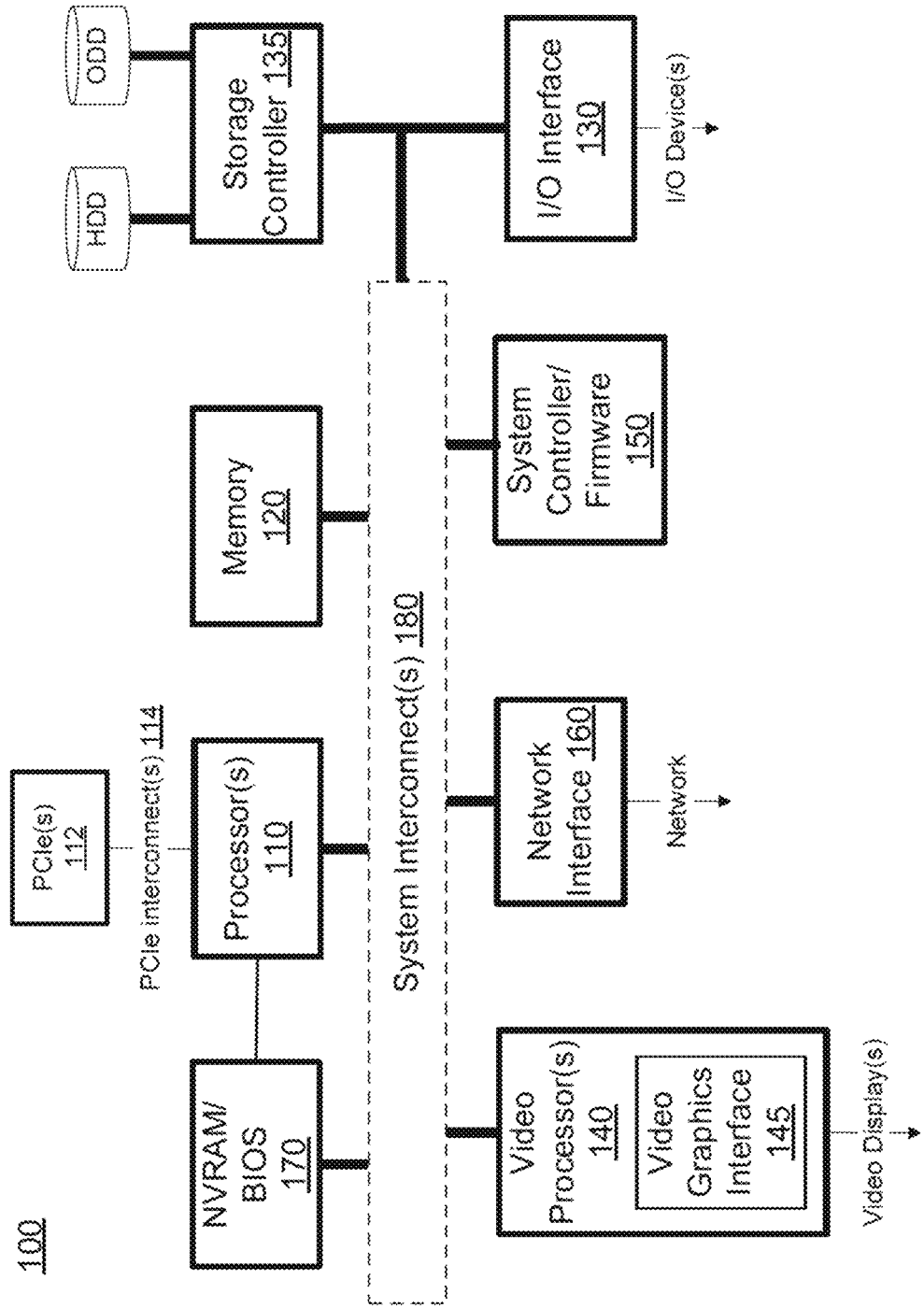
FIG. 1 provides a block diagram representation of an example information handling system with PCIe interconnects within which certain aspects of the disclosure can be practiced, according to one embodiment.

The illustrative embodiments provide a method, a system, and an information handling system for a flexible interconnection between a CPU and I/O devices within an information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware components and basic configuration depicted in the following figures may vary. For example, the illustrative components within information handling system 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system and a display device of or for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

With reference now to the figures, and beginning with FIG. 1, there is depicted a block diagram representation of an example information handling system (IHS) 100, within which one or more of the described features of the various embodiments of the disclosure can be implemented. Information handling system 100 includes at least one central processing unit ("CPU") or processor(s) 110 coupled to system memory 120 via system interconnect(s) 180. System interconnect(s) 180 can be interchangeably referred to as an interconnect chipset, in one or more embodiments. The system interconnect(s) 180 may support multiple processors, allow simultaneous processing by each of the processors and permit the exchange of information among the processors and other components of the information handling system 100. Information handling system 100 also includes PCIe interconnect 114, which serves as a general purpose I/O interconnect for communicating with attached I/O and other devices. PCIe interconnect 114 operates according to the PCIe standard and can handle high bandwidth transfers.

Information handling system 100 also includes nonvolatile storage ("NVRAM") 170, which is also coupled to system interconnect(s) 180. NVRAM 170 can be utilized to store one or more software and/or firmware modules, basic input/output system ("BIOS"), and one or more sets of data that can be utilized during startup operations of information handling system 100. These one or more software and/or firmware modules can be loaded into system memory 120 during operation of information handling system 100. Specifically, in one embodiment, system memory 120 can include therein a plurality of such modules, including one or more of firmware ("F/W"), basic input/output system ("BIOS"), operating system ("O/S"), and application(s). These software and/or firmware modules have varying functionality when their corresponding program code is executed by CPU 110 or secondary processing devices within information handling system 100. In one embodiment of the disclosure, the referenced secondary processing devices can be a base motherboard controller (BMC), which operates the power and thermal control algorithm for the system. With this embodiment, the BMC utilizes a detection and/or inventory method to determine which type of PCI devices are populated.

Information handling system 100 further includes one or more input/output (I/O) controllers 130 which support connection by and processing of signals from one or more connected input device(s), such as a keyboard, mouse, touch screen, or microphone. I/O controllers 130 also support connection to and forwarding of output signals to one or more connected output devices, such as a monitor or display device or audio speaker(s). Additionally, in one or more embodiments, one or more storage controller(s) 135, such as an optical reader, a universal serial bus (USB), a card reader, Personal Computer Memory Card International Association (PCMCIA) slot, and/or a high-definition multimedia interface (HDMI), can be associated with IHS 100. Storage controller(s) 135 can be utilized to enable data to be read from or stored to corresponding removable storage device(s) 138, such as a compact disk (CD), digital video disk (DVD), flash drive, or flash memory card. In one or more embodiments, storage controller(s) 135 can further include General Purpose I/O interfaces such as $I^2C$, SMBus, and peripheral component interconnect (PCI) buses. It is appreciated that any I/O device with PCIe interconnect capability may communicate over the PCIe interconnect(s) 114.

Information handling system 100 includes a network interface 160. Network interface 160 enables information handling system 100 and/or components within information handling system 100 to communicate and/or interface with other devices, services, and components that are located external to information handling system 100. These devices, services, and components can interface with information handling system 100 via an external network (not shown) using one or more communication protocols. Additionally, a network device with PCIe interconnects may communicate over the PCIe interconnect(s) 114.

Information handling system 100 can also include at least one video processor(s) 140 having video graphics interface 145. Video graphics interface 145 can be utilized with applications requiring sophisticated graphics and computation of graphics and video. Video processor(s) 140 (and by extension video graphics interface 145) is connected to system interconnect(s) 180 and shares information within the information handling system. System interconnect(s) 180 can support multiple video processors 140. Video graphics interface 145 is connected to an external video display, such as a flat panel or other type of display device. In at least one alternate embodiment, video processor(s) 140 can be a graphics processing unit (GPU) and can be collocated along with processor 110 on a processor chip. It is appreciated that a GPU that has PCIe interconnects may communicate over the PCIe interconnect(s) 114. In that regard, and as provided within the present disclosure, GPUs may be used for general purpose computing and high density parallel computing over the PCI interface.

Figure 2:
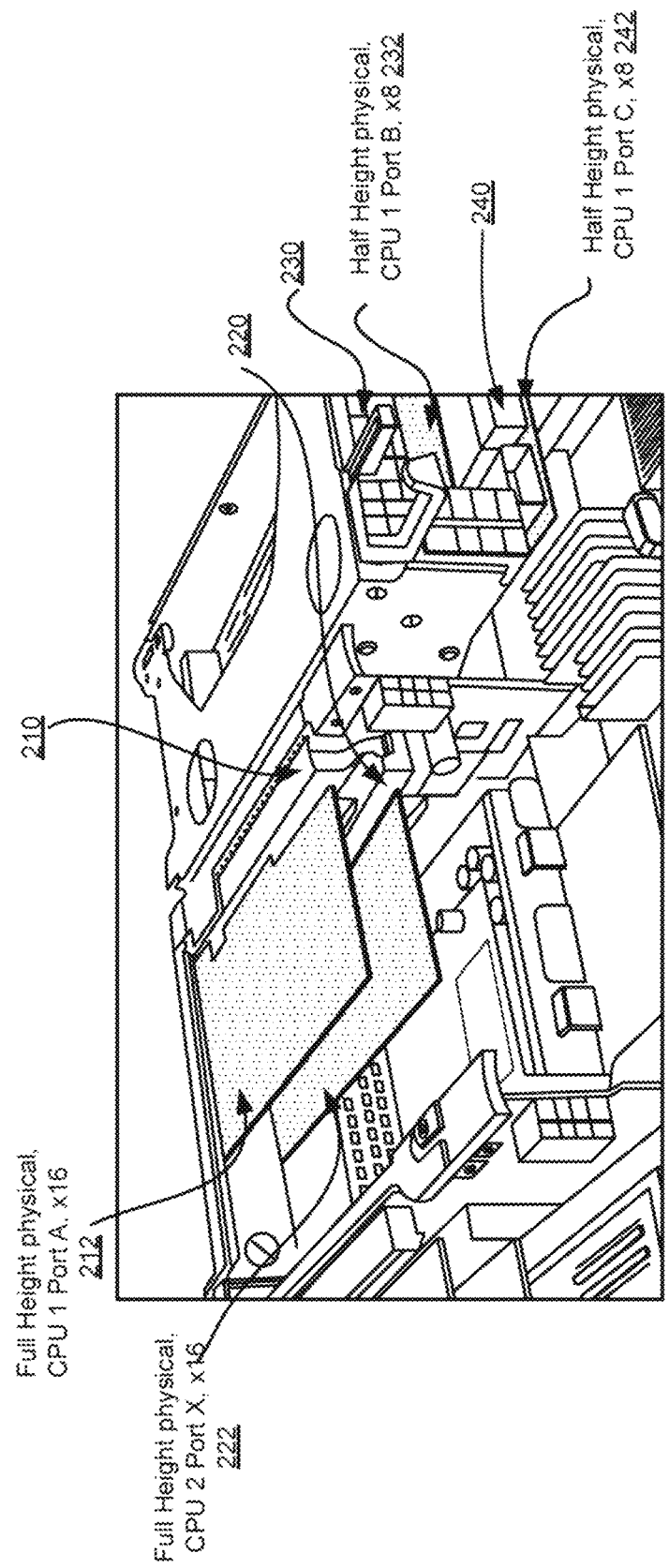
FIG. 2 illustrates an example information handling system with two full height PCI cards and two half height physical PCI cards with hardwired interconnects, in accordance an existing embodiment.

FIG. 2 illustrates a conventional configuration of PCIe devices within an information handling system having four PCIe devices with hardwired interconnects. The information handling system in this example includes two CPUs. CPU 1 has three ports: Port A is allocated to I/O slot 210; Port B is allocated to I/O slot 230; and Port C is allocated to I/O slot 240. CPU 2 has Port X which is allocated to occupy I/O slot 220. A first PCIe card 212 with 16 channels (x16) is inserted in a full height physical I/O slot 210 that is connected by hardwired interconnects to Port A of CPU 1 within the layers of the printed board circuit (PBC). A second PCIe card 222 with x16 is inserted in a full height physical I/O slot 220 that is connected by hardwired interconnects from Port X of CPU 2. Because the interconnects are hardwired, CPU 2 Port X will permanently connect to the I/O slot 220 and cannot be reallocated. By the same token, CPU 1 Port A will always occupy I/O slot 210. The first PCIe card 212 and second PCIe card 222 may be pulled from their respective I/O slots and can be swapped into another I/O slot with 16 channels, however, the interconnect cannot be swapped when hardwired within the PBC. Further illustrated is a third PCIe card 232 with low height physical and less channels of x8 and a fourth PCIe card 242. Third PCIe card 232 is inserted in a designated I/O slot 230 for Port B of CPU 1, and fourth PCIe card 242 is inserted in a designated slot for Port C 240 of CPU 1. The inventory scheme of this system is CPU 1 has three ports and CPU 2 has one port. Each port is hardwired to a predetermined dedicated I/O slot without any flexibility; and the ports and I/O slots cannot be reallocated.

Figure 3:
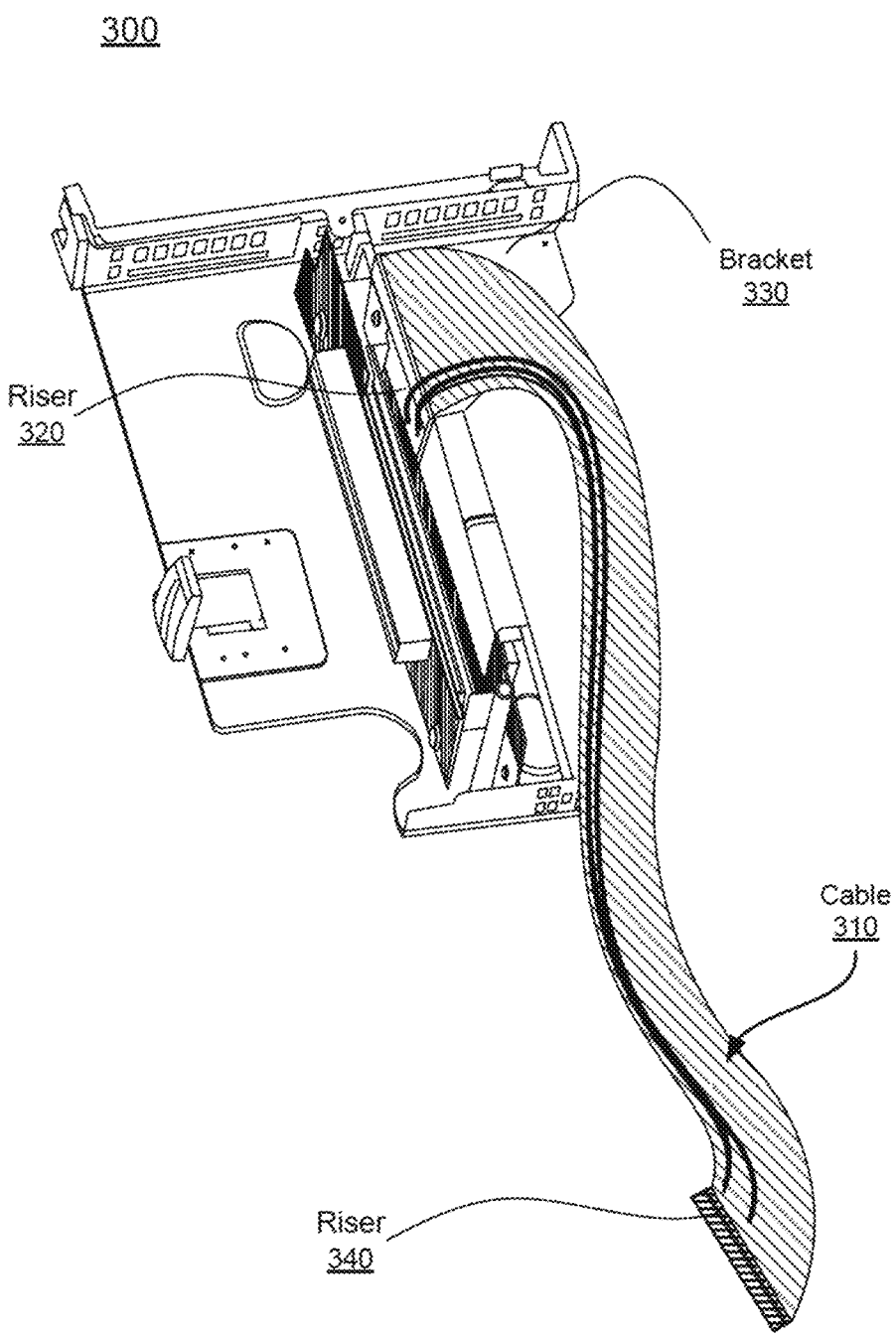
FIG. 3 illustrates a flexible interconnect media with cables, risers at the end of the cables and a bracket for anchoring, according to one embodiment.

Referring now to FIG. 3, there is illustrated an example flexible interconnect media (FIM) 300, which represents one aspect of the disclosure. The flexible interconnect media 300 is depicted as a separate and independent component from the printed board circuit and is, by design and application, not hardwired into the PBC. Flexible interconnect media 300 provides the physical interconnections between a designated port and a stand-alone I/O slot. Flexible interconnect media 300 includes a cable 310, riser 320, and bracket structure 330. Cable 310 includes an outer sheath within which is run a plurality of wires supporting the interconnections of differential signal pairs and sideband signals and the supply of power to the I/O slot. I/O slot can provide a plug-in or interconnection for an I/O device. According to one embodiment, a stand-alone I/O slot depends on flexible interconnect media for proper signals and connections such as differential signal pairs, sideband signals, and power supply to the I/O slot and ultimately to the I/O device connected to the I/O slot. The sideband signals include signals that are not part of the data flow such as signals providing status and controls. At an end of the cable 310 is a riser 320. Riser 320 allows for signals to be broken out into different connection standards, such as an I/O slot from which an I/O device makes connections with PCI or PCIe interconnection standards. The riser/cable has identifying pins that are associated with location, PCI bandwidth, cooling capabilities, and power requirements. Included with riser 320 is mechanical bracket structure 330 that is capable of mounting an I/O device to a chassis slot and anchoring the I/O device to the chassis of the information handling system. It is appreciated that bracket 330 may be designed for the specific physical characteristics (height, length, external ports, and power level) of the chassis I/O slot. Mechanical bracket structure 330 also anchors the flexible interconnect media 300. In the illustrative embodiment, another riser 340 is provided on the other end of cable 310. Each flexible interconnect media 300 further includes an interconnect identification (ID), which may include bits of data indicating whether an I/O device is present and has been inserted into an I/O slot. By using the identifying pins on riser 320, the riser and device type are presented at riser 340 communicated through cable 310. When, for example, riser 320 is inserted into link tap X 522 (FIG. 5), then the interconnect identification further provides information about the inserted I/O device and the power and cooling requirements to link tap X 522. With these identification pins detected at link tap X 522, the IHS will operate with correct allotments for CPU PCI ports, power and cooling allotments, and status/inventory of the device. It is appreciated that flexible interconnect media 300 may also have a number of pins dedicated to the interconnect identification or that the interconnect identification is located in a dedicated chip on riser 320.

Figure 4A:
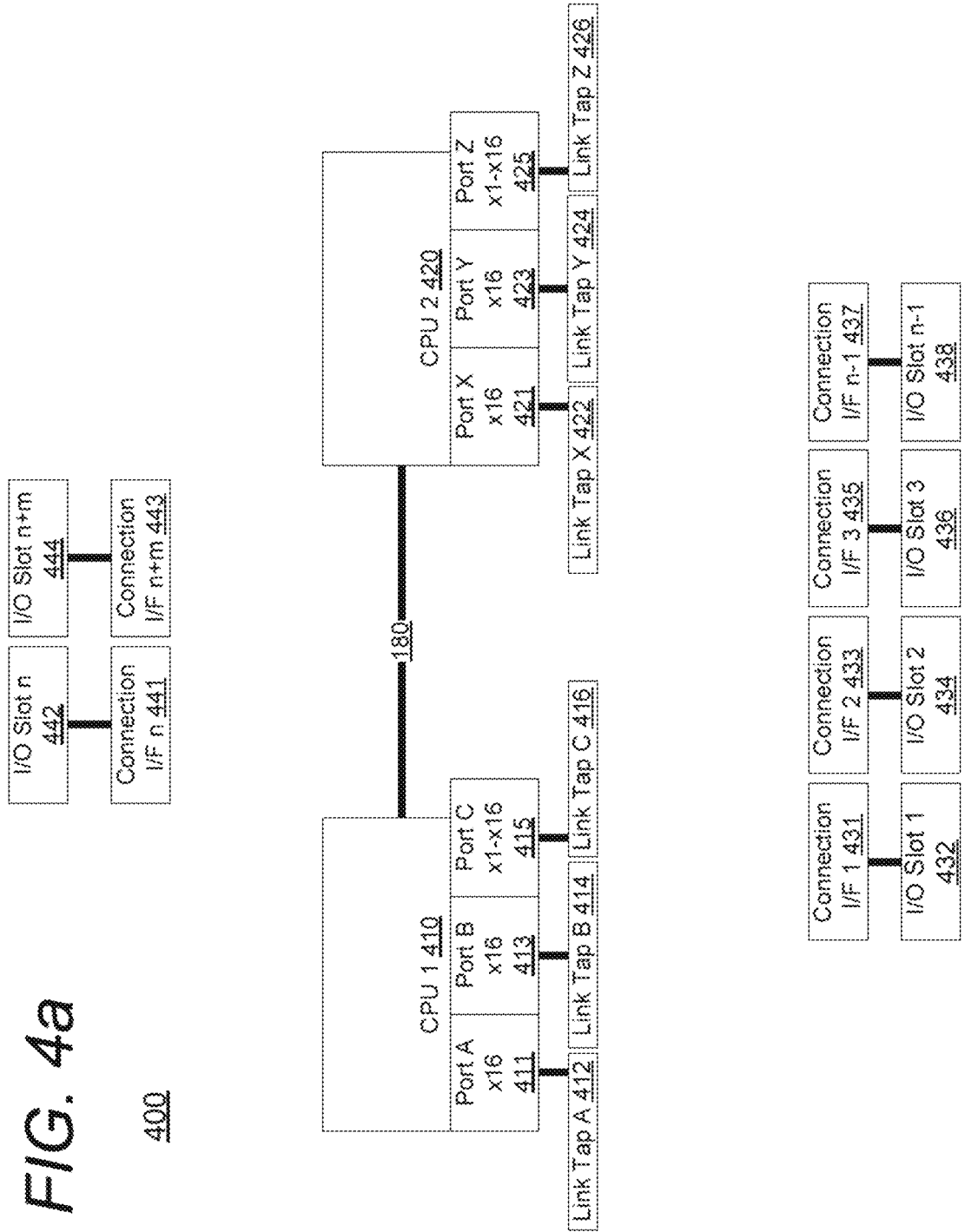
FIG. 4a is a detailed block diagram illustrating an information handling system without interconnects and independent I/O slots, according to one embodiment.

FIGS. 4a-4d illustrate different embodiments of an information handling system with flexible interconnect media system. Referring now to FIG. 4a, an information handling system 400 is illustrated with two CPUs, CPU 1 410 and CPU 2 420. CPU 1 410 and CPU 2 420 are interconnected via system interconnect(s) 180 and can communicate with each other and other components (not specifically shown) of the information handling system 400 over the system interconnect(s) 180. Additionally, each of CPU 1 410 and CPU 2 420 have designated ports. CPU 1 410 has three ports, port A 411, port B 413, and port C 415. CPU 2 420 also has three ports, port X 421, port Y 423, and port Z 425. According to another aspect of the disclosure and as illustrated, none of these designated ports have interconnections that are hardwired to a stand-alone I/O slot.

As further illustrated, each port has a corresponding link tap assigned thereto. Thus, port A 411 is connected to correlated link tap A 412. Also, port B 413, port C 415, port X 421, port Y 423, and Port Z 425 are respectively connected to link tap B 414, link tap C 416, link tap X 422, link tap Y 424, and link tap Z 426. Therefore, each link tap is coupled to a specific port, but not linked to a physical chassis or device location. In the described embodiment, the link taps are centrally located in the IHS, and are designed to be accessed by the flexible interconnect media. Each link tap is centrally located in the IHS, and near to the assigned port and CPU complex. This central location in the IHS is an important factor that enables access to any of the physical PCI device locations, via flexible interconnect media.

As further illustrated, information handling system 400 also includes a plurality of I/O slots: I/O slot 1 432, I/O slot 2 434, I/O slot 3 436, I/O slot n−1 438, I/O slot n 442, and I/O slot n+m 444. Each I/O slot is connected to a correlated connection interface. Thus, I/O slot 1 432 is connected to correlated connection interface 1 431. I/O slot 2 434 is connected to correlated connection interface 2 433. I/O slot 3 436 is connected to correlated connection interface 3 435. I/O slot n−1 438 is connected to correlated connection interface n−1 437. I/O slot n 442 is connected to correlated connection interface n 441. And I/O slot n+m 444 is connected to correlated connection interface n+m 443. A connection interface with its correlated I/O slot is not hardwired within the PCB. Rather, the pairing of I/O slot and connection interface has electrical independence from the PCB and can be considered "stand-alone" in that regard. It is appreciated that the I/O slot may be electronically independent from the motherboard when a flexible interconnect media is not utilized. According to one embodiment, each I/O slot can include a slot identification providing information about the type of I/O devices that are compatible to the interconnect standard and that can be inserted into the I/O slot. Other information that can be determined from or provided by the slot identification includes the location of the I/O slot, the maximum cooling capability of the specific location, and the maximum bandwidth of the slot. With respect to the latter information, for example, the slot identification can indicate the maximum channels that the slot would accommodate. The bandwidth of the I/O slot is linearly increased by the number of the channels. A x4 channel would have twice the bandwidth over a x2 channel, and a x32 channel is eight times faster than a x4 channel.

Figure 4B:
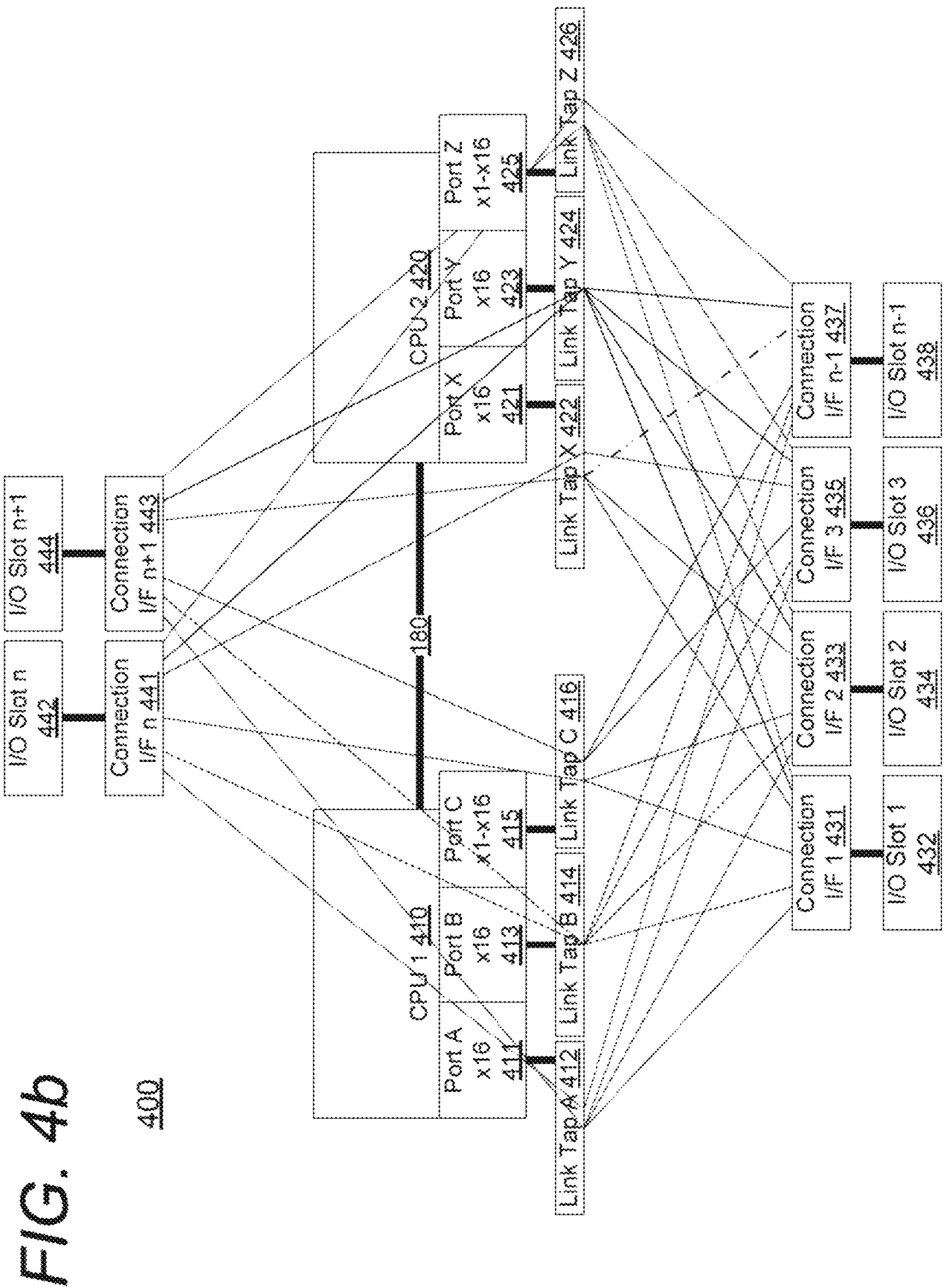
FIG. 4b is a block diagram illustrating an information handling system with flexible interconnect media system replacing hardwired interconnects, according to one embodiment.

According to one aspect, there is no interconnection between the ports and the I/O slots since there are no hardwired interconnections between the link taps and the connection interfaces, without introducing a flexible interconnect media. Turning now to FIG. 4b, each link tap is capable of being connected to any I/O slot with a flexible interconnect media via correlated connection interface. The FIMs are depicted by dotted lines. Each dotted line in FIG. 4b represents a possible connection of the flexible interconnect media to form an interconnection between a port and an I/O slot, whereby an I/O device is inserted into the I/O slot. The port may freely connect any I/O slot via a flexible interconnect media, making interconnection between the correlated link tab to the port and correlated connection interface to the I/O slot.

Figure 4C:
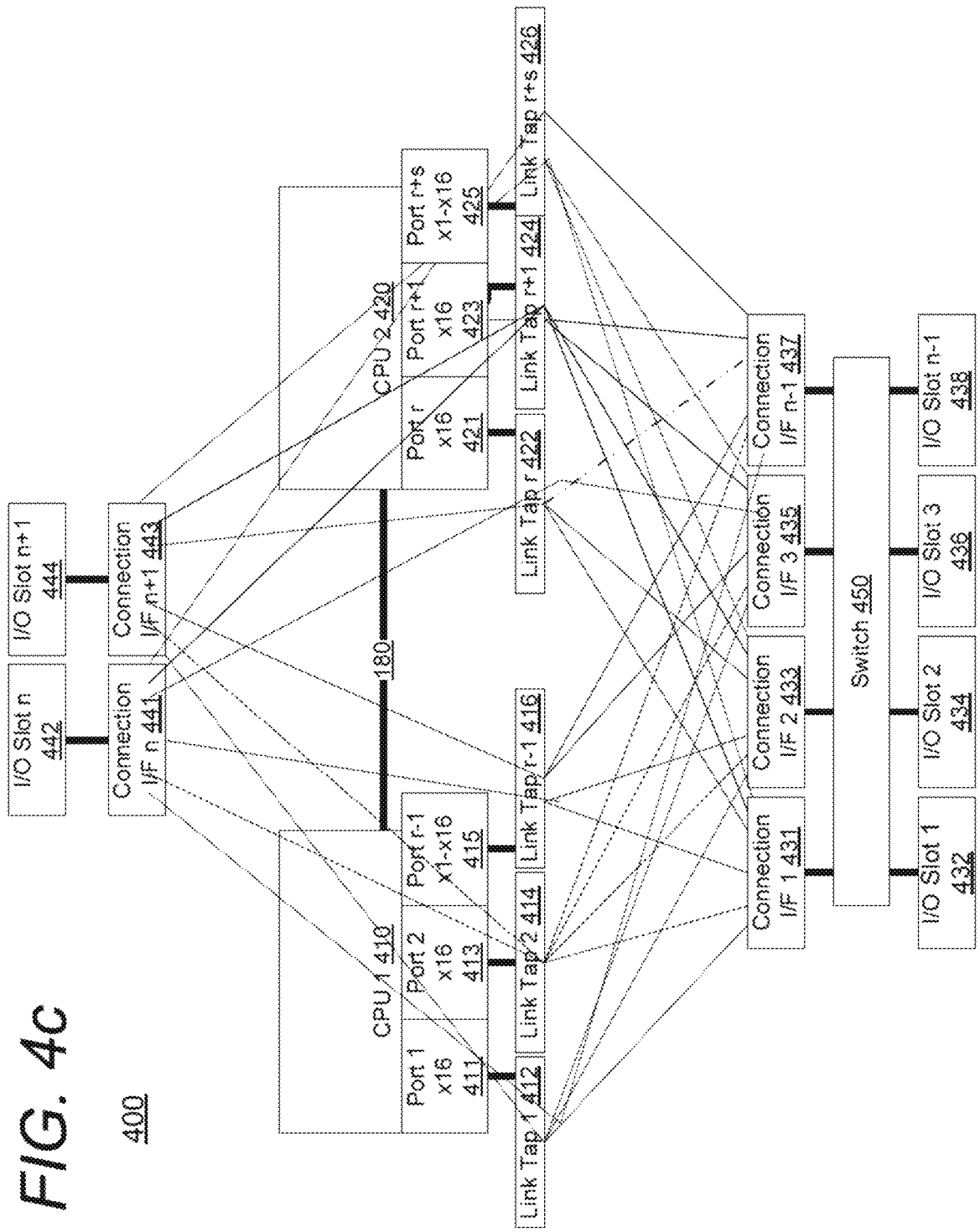
FIGS. 4c and 4d are block diagrams illustrating an information handling system with a flexible interconnect media system and PCI switch, according to one or more embodiments.
Figure 4D:
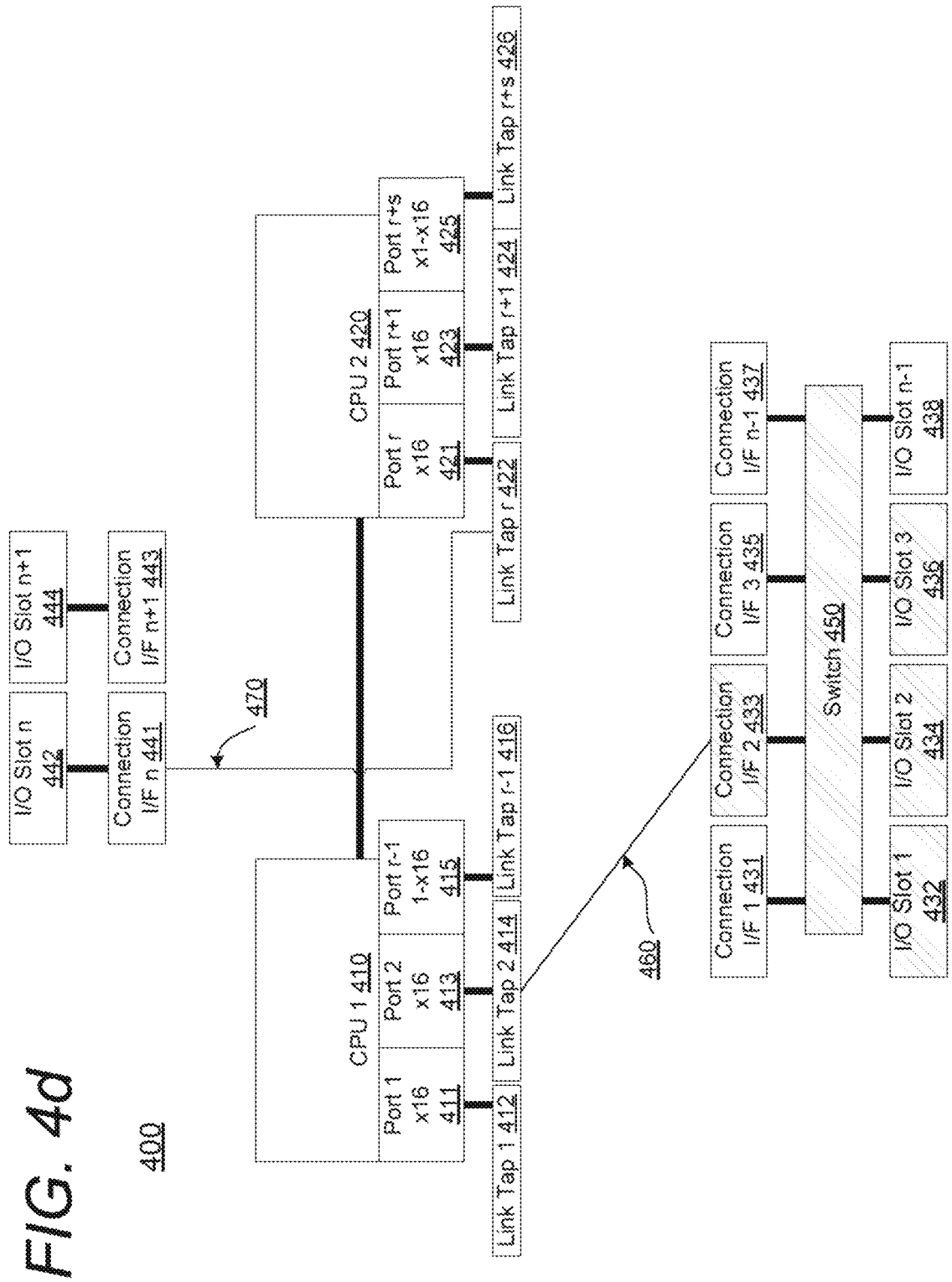

Referring now to FIG. 4c, the information handling system 400 is further illustrated with a switch 450 for multiple I/O slots. Switch 450 is programmable and allows the sharing of one designated port with multiple I/O slots. Switch 450 is capable of handling differential signals for PCI or PCIe standard and sideband signals standard. CPU 1 410 and CPU 2 420 may have any number of designated ports. And, the number of I/O slots does not have to be the same as the number of ports. FIG. 4d provides an exemplary information handling system 400 with switch 450 utilized for the sharing of port 2 413 of CPU 1 410 between three I/O slots 432, 434, and 436. It is appreciated that each I/O slot will have an inserted I/O device, such as a graphic processing unit (GPU), for example. Port 2 413 is connected to switch 450 via flexible interconnect media 1 FIM 1) 460 by connecting one end of flexible interconnect media to link tap 2 414 and the other end of the FIM to connection I/F 2 433. Port r 421 of CPU 2 420 has been connected to I/O slot n 442 via flexible interconnect media 2 (FIM 2) 470. One end of flexible interconnect media 2 470 is connected to connection interface n 441 and the other end of FIM 2 470 is connected to link tap r 422.

Figure 4E:
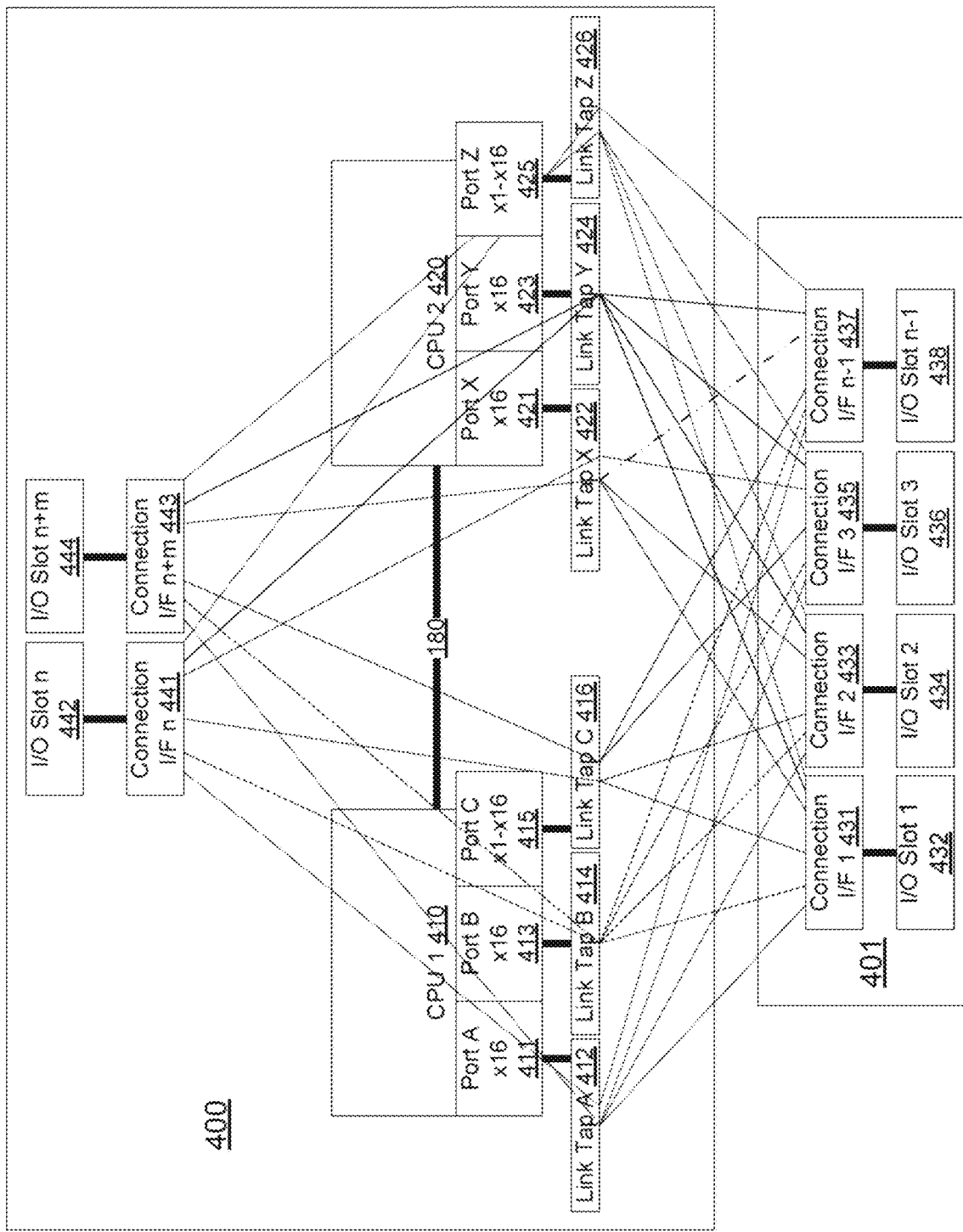
FIG. 4e depicts a block diagram illustrating an information handling system with a flexible interconnect media system and separate remote chassis housing I/O slots, according to one embodiment.

Referring to FIG. 4e the information handling system 400 is further illustrated with a separate remote chassis 401. Separate remote chassis 401 includes connection interface 1 431, connection interface 2 433, connection interface 3 435, and connection interface n−1 437. The connection interfaces are respectively coupled to I/O slot 1 432, I/O slot 2 434, I/O slot 3 436, and I/O slot n−1 438, where each I/O slot is capable of receiving an I/O device. Some illustrative possible flexible interconnect media connections are shown in dotted lines between a link tap located in information handling system 400 and a connection interface located in separate remote chassis 401. The flexible interconnect media may provide interconnections between the information handling system 400 and separate remote chassis 401. Separate remote chassis 401 has independent physical power requirements and cooling requirements and depends on the flexible interconnect media for the signals to the I/O slots 1, 2, 3, n−1 (432, 434, 436, and 438).

Figure 5:
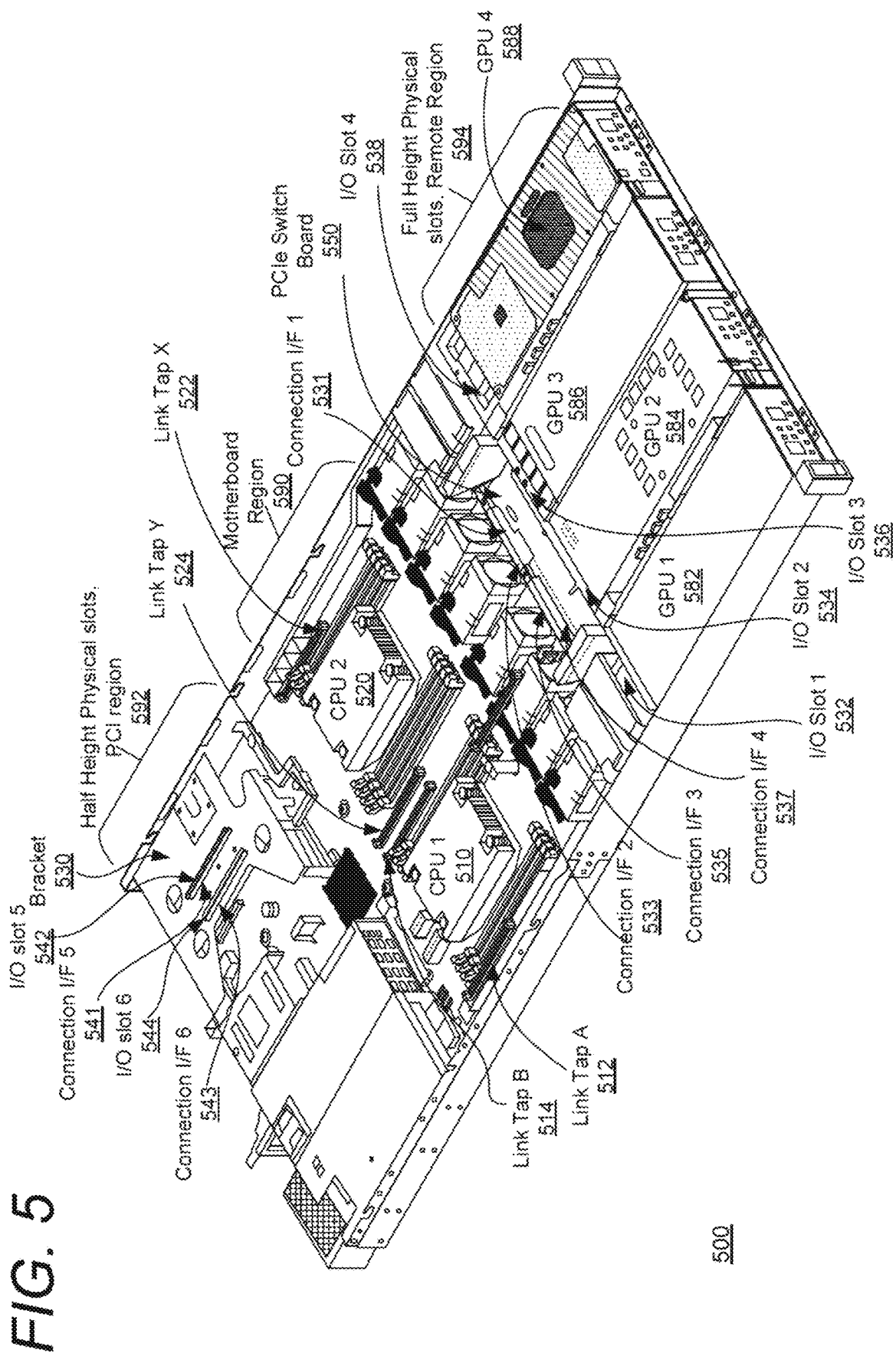
FIG. 5 provides a diagram representing an example information handling system on a printed circuit board having a motherboard region, PCI region, and remote region and utilizing the flexible interconnect media system, in accordance with one or more embodiments.

FIG. 5 is an example information handling system 500 with a motherboard region 590 having two CPUs, a PCI region 592, and a remote region 594. Each CPU has two ports (not shown), each port having a corresponding link tap. Link tap A 512, link tap B 514, link tap X 522, and link tap Y 524 are centrally located, which allows for easy access and connection to the I/O slots 1, 2, 3, 4, 5, and 6 (532, 534, 536, 538, 542, and 544) via flexible interconnect media (not shown). I/O slot 5 542 and I/O slot 6 544 are in the PCI region 592 located in the rear of the PCB. At this location, network I/O cards can be inserted into I/O slots 5 and 6 542, 544 where bracket 530 is shown. Bracket 530 is shown without the cable and riser assembly of a flexible interconnect media. In the illustrated embodiment, the final two ports (i.e., one from each CPU) are routed through the motherboard to an associated riser slot. With this configuration, using the hardwired port versus the flexible interconnect to the rear slots (at PCI region 592) is optional and a design choice. According to the primary embodiments described herein and as general implementation detail, all of the CPU ports can be configured to require use of a flexible interconnect media. The illustrated embodiment is therefore not intended to imply any limitation on the more general implementations described herein.

It is appreciated that network I/O cards usually require less bandwidth than other PCIe devices, such as a GPU. A network card fits in a half-sized slot and requires about 25 W for cooling, while a GPU requires a full length slot with more bandwidth and 300 W for cooling. The full-length slots are shown in FIG. 5 with inserted I/O devices, GPU 1 582, GPU 2 584, GPU 3 586, and GPU 4 588 in the remote region 594 below the motherboard region 590 and away from the PCI region 592. The remote region 594 is designed to accommodate more cooling capacity with four GPUs each requiring 300 W of cooling. The I/O devices in the I/O slots 1, 2, 3, and 4 (532, 534, 536, 538) may be all GPUs for real general purpose computational uses, real time videos and other graphic and compute usages, while I/O slot 5 542 and I/O slot 6 544 can be utilized to house or connect network cards. The region for slots 1, 2, 3 and 4 is remote because of the large form factor required for these desired GPU devices. It is beneficial for the slots to be remote, as the remote location allows for greater packaging density and better thermal characteristics if these PCI GPU devices are located some distance from the motherboard.

Figure 6:
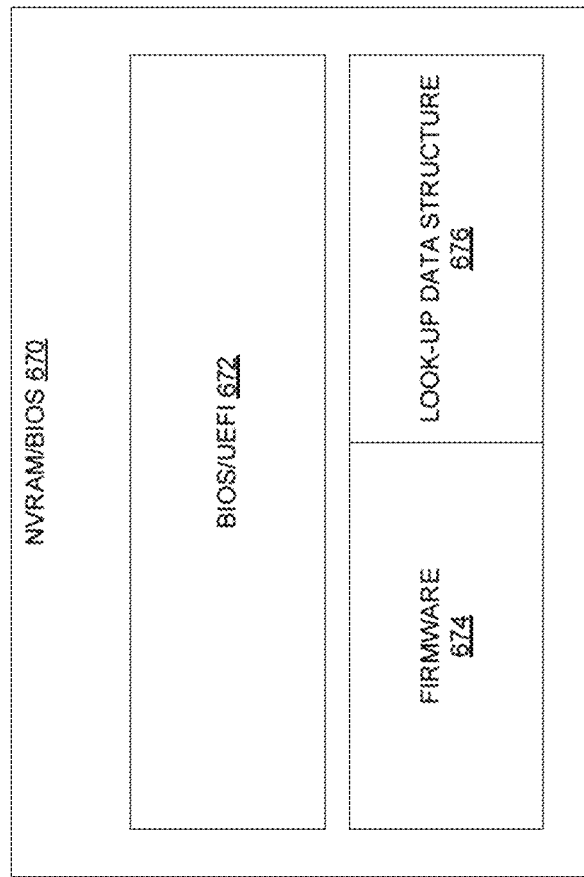
FIG. 6 illustrates a block diagram representation of a nonvolatile storage for the information handling system including BIOS, firmware, and look-up data structure, in accordance with one or more embodiments.

FIG. 6 illustrates an exemplary nonvolatile storage 670 configured with basic input/output system (BIOS) 672, firmware 674, and look-up data structure 676. When a FIM is connected to one of the I/O slots, the BIOS 672 or system management controller 150 of the information handling system reads the interconnect identification and slot identification. The firmware 674, located in the nonvolatile storage 670 or system controller 150, identifies the I/O device that may be connected to each I/O slot, detects and or determines the I/O device bandwidth, assists in the system inventory management, and enforces the correct power and cooling control. The firmware 674 includes a lookup data structure 676 having operating characteristics associated with all combinations of PCI devices that can be coupled to the flexible interconnect media. The lookup data structure 676 can include all or substantially all of the possible combinations of I/O devices such as PCI devices associated with the flexible interconnect media. Lookup data structure 676 includes a listing of necessary inventory, power requirements and cooling requirements for a plurality of different I/O devices that can be connected to an I/O slot. Firmware 674 in the information handling system 600 can be configured to detect an identification of the I/O slot and an identification of the flexible interconnect media, determine the I/O device that can be coupled to the I/O slot, keep track of system inventory, and determine power requirements and cooling requirements of the I/O device.

Figure 7:
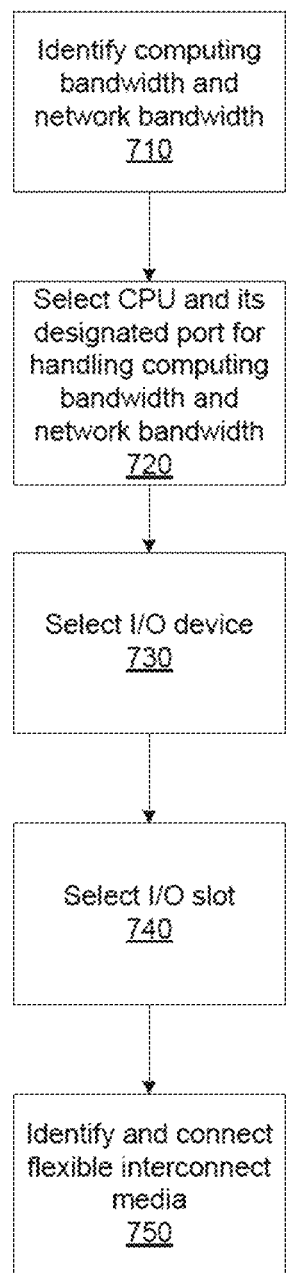
FIG. 7 is a flow chart illustrating processes within a method for identifying bandwidth and selecting port and I/O devices to support the identified bandwidth, in accordance with one or more embodiments.

Referring now to FIG. 7, the flow chart describes the method 700 for selecting the inventory of I/O devices that can be installed in the information handling system with a flexible interconnect media system for interconnecting an I/O device. First, the computing bandwidth and network bandwidth are identified (block 710). It is appreciated that in one example implementation, a customer would describe the needs of their business, then the system personnel or software program would be able to identify computing and networking bandwidths that satisfy the base needs of the customer. Next, an information handling system with correlated inventory is selected to handle the business computing and networking needs. The selection process includes: selecting the CPU with the designed ports that which can accommodate the identified bandwidths (block 720), selecting an I/O device that has the desired bandwidth and performance characteristics such as power consumption characteristic and cooling requirement (block 730), and selecting an open chassis I/O slot that matches the size, power and cooling requirement of the selected I/O device (block 740). Thus, selecting the location of the selected I/O slot includes matching the physical size, power consumption and cooling requirement. With the I/O slot and designated port selected, a flexible interconnect media is required to form an interconnection between the CPU and I/O device. The flexible interconnect media electronically connects the link tap with the selected I/O slot and thus completes the interconnection between the CPU and I/O device (block 750).

Figure 8:
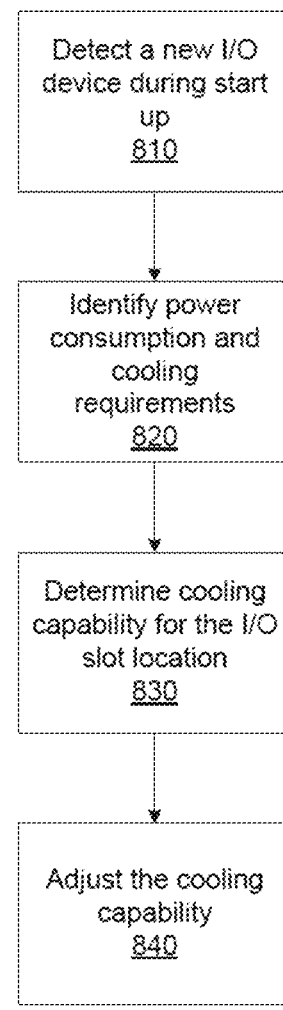
FIG. 8 is a flow chart illustrating method processes during a startup of an information handling system with a new I/O device detected, according to one or more embodiments.

The startup process of the information handling system is described by the method 800 illustrated by the flow chart of FIG. 8. During startup, the BIOS detects that a new I/O device has been installed (block 810). After reading the interconnect identification and slot identification, the firmware identifies the power consumption characteristic and cooling requirement of the I/O device in block 820 and determines the cooling capability of the information handling system for the selected I/O slot in accordance with the I/O device and the location of the selected I/O slot (block 830). The BIOS or firmware adjusts the cooling capability according to the cooling requirement of the selected I/O device (block 840). It is appreciated that the information handling system 800 includes cooling devices such as cooling fans that are adjustable to a cooling requirement.

In the above described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
  a plurality of central processing units (CPUs), each CPU having a plurality of designated ports for input/output (I/O) device interconnects;
  a flexible interconnect media system that connects a CPU to one or more I/O devices, the flexible interconnect media system comprising:
    a plurality of I/O slots, each I/O slot capable of receiving an I/O device;
    a plurality of connection interfaces, each correlated to one I/O slot of the plurality of I/O slots and connected to the correlated I/O slot;
    a plurality of link taps, each assigned to one designated port of the plurality of designated ports and connected to the assigned designated port, wherein the link tap is not linked to a physical chassis or device location, wherein the link tap is located and designed to be accessible for connecting to a flexible interconnect media; and
    at least one flexible interconnect media, each capable of interconnecting an open connection interface with an open link tap, the connection interface correlated and connected to an I/O slot at which the I/O device is received, whereby a connection between the CPU and the I/O device is completed via the flexible interconnect media extending between the connection interface and open link tap, wherein the connection between the I/O slot and the port is not hardwired into a PCB, the allocation of the port and the I/O slot are flexible, and a pairing of the I/O slot and a connection interface has electrical independence from the PCB;
    wherein the correlated I/O slot is reserved for a target device having a desired bandwidth and an identified cooling requirement, wherein selecting a slot location for the target device includes matching device characteristics of physical size, power consumption, and a cooling requirement to corresponding requirements satisfied by the correlated I/O slot; and
  a memory having firmware stored thereon, the firmware executed by at least one CPU among the plurality of CPUs to enable the information handling system to:
    detect a new I/O device coupled to an I/O slot during a start-up process of the information handling system;
    detect an identification of the I/O slot and an identification of the flexible interconnect media;
    determine the I/O device that can be coupled to the I/O slot based on the identification of the I/O slot and the identification of the flexible interconnect media;
    determine power requirements and cooling requirements of the new I/O device, in part based on the identification of the I/O slot;
    identify at least a power consumption characteristic and a cooling requirement for the detected I/O device;
    determine a cooling capability of the information handling system for the I/O slot based on the new I/O device coupled to the I/O slot and existing cooling devices of the IHS; and
    adjust, via the existing cooling devices of the IHS that are adjustable to a cooling requirement of the I/O device coupled to the slot, the cooling capability for the I/O slot from the determined cooling capability, based on the cooling requirement of the I/O device coupled to the slot.

2. The information handling system of claim 1, wherein: each flexible interconnect media has an interconnect identification that identifies the power consumption characteristic, the cooling requirement, and type of I/O device inserted into the correlated I/O slot the interconnect identification comprising bits of data indicating whether an I/O device is present and has been inserted into an I/O slot wherein the flexible interconnect media has a number of pins dedicated to the interconnect identification; and wherein the firmware configures the IHS to operate with correct allotments for CPU PCI ports, power and cooling allotments, and status/inventory of the device.

3. The information handling system of claim 1, wherein each I/O slot has a unique slot identification that identifies the type of I/O devices that can be inserted, maximum bandwidth that the I/O slot accommodates, location of the I/O slot, and maximum cooling capability of the location, the maximum bandwidth comprising a maximum number of channels that the I/O slot would accommodate.

4. The information handling system of claim 1, further comprising firmware that:
  detects an identification of the I/O slot and an identification of the flexible interconnect media;
  determines the I/O device that is inserted into the I/O slot;
  makes a system inventory of the information handling system including the inserted I/O device and characteristics thereof; and
  determines power requirements and cooling requirements of the inserted I/O device.

5. The information handling system of claim 4, wherein the firmware comprises a lookup data structure having operating characteristics associated with all combinations of peripheral component interconnect (PCI) devices that can be coupled to the flexible interconnect media.

6. The information handling system of claim 1, wherein the plurality of designated ports have variable bandwidths and are compatible with at least one I/O interface standard, including peripheral component interconnect (PCI) and peripheral component interconnect express (PCIe).

7. The information handling system of claim 1, wherein the plurality of connection interfaces are further coupled to a programmable switch that allows sharing of one designated port with multiple I/O slots.

8. The information handling system of claim 1, wherein the plurality of I/O slots and the plurality of connection interfaces are located outside of the information handling system.

9. The information handling system of claim 8, wherein the flexible interconnect media provides an interconnection from the information handling system to a separate remote chassis with independent physical characteristics such as cooling requirements and power requirements.

10. The information handling system of claim 1, wherein each I/O slot is capable of receiving different types of I/O devices having different bandwidths by using the flexible interconnect media to connect to the I/O slot.

11. The information handling system of claim 1, wherein a designated port connects to any open I/O slot with the flexible interconnect media.

12. The information handling system of claim 1, wherein the flexible interconnect media further comprises a mechanical bracket structure that is utilized to anchor the flexible interconnect media to a chassis I/O slot location.

13. The information handling system of claim 1, wherein the plurality of link taps are centrally located and are only connectable to an I/O slot with a flexible interconnect media.

14. A flexible interconnect media system capable of connecting a CPU to an I/O device, the flexible interconnect media system comprising:
   a plurality of I/O slots that are each capable of receiving an I/O device;
   a plurality of connection interfaces wherein each connection interface is correlated with one I/O slot of the plurality of I/O slots and is connected to the correlated I/O slot;
   wherein the CPU has a plurality of designated ports for input/output (I/O) device interconnects, and the flexible interconnect media system comprises a plurality of link taps each assigned to one designated port of the plurality of designated ports and connected to the assigned designated port, wherein the link tap is not linked to a physical chassis or device location, wherein the link tap is located and designed to be accessible for connecting to a flexible interconnect media;
   at least one flexible interconnect media, each capable of interconnecting an open connection interface with an open link tap, the connection interface correlated and connected to an I/O slot at which the I/O device is received, whereby a connection between the CPU and the I/O device is completed via the flexible interconnect media extending between the connection interface and open link tap, wherein the connection between the I/O slot and the port is not hardwired into a PCB, the allocations of the port and the I/O slot are flexible, and a pairing of the I/O slot and a connection interface has electrical independence from the PCB;
   wherein the correlated I/O slot is reserved for a target device having a desired bandwidth and an identified cooling requirement, wherein selecting a slot location for the target device includes matching device characteristics of physical size, power consumption, and a cooling requirement to corresponding requirements satisfied by the correlated I/O slot; and
   wherein the CPU is a part of an information handling system that comprises a memory having firmware stored thereon, the firmware executed by the CPU to enable the CPU to:
      detect a new I/O device coupled to an I/O slot during a start-up process of the information handling system;
      detect an identification of the I/O slot and an identification of the flexible interconnect media;
      determine the I/O device that can be coupled to the I/O slot based on the identification of the I/O slot and the identification of the flexible interconnect media;
      determine power requirements and cooling requirements of the new I/O device, in part based on the identification of the I/O slot;
      identify at least a power consumption characteristic and a cooling requirement for the detected I/O device;
      determine a cooling capability of the information handling system for the I/O slot based on the I/O device coupled to the slot and existing cooling devices of the IHS; and
      adjust, via the existing cooling devices of the IHS that are adjustable to meet a cooling requirement of the I/O device coupled to the slot, the cooling capability for the I/O slot from the determined cooling capability, based on the cooling requirement of the I/O device coupled to the slot.

15. The flexible interconnect media system of claim 14, further comprising:
   an interconnect identification that identifies a power consumption characteristic, a cooling requirement, and the type of I/O device inserted into the correlated I/O slot, the interconnect identification comprising bits of data indicating whether an I/O device is present and has been inserted into an I/O slot; wherein the flexible interconnect media has a number of pins dedicated to the interconnect identification; and wherein the firmware configures the IHS to operate with correct allotments for CPU PCI ports, power and cooling allotments, and status/inventory of the device; and
   wherein each I/O slot has a unique slot identification that identifies the type of I/O devices that can be inserted, bandwidth, location of the correlated I/O slot, and maximum cooling capability of the location.

16. The flexible interconnect media system of claim 14, wherein the plurality of connection interfaces are further coupled to a programmable switch that allows sharing of one designated port with multiple I/O slots.

17. The flexible interconnect media system of claim 14, wherein a designated port is capable of connection to any open I/O slot with the flexible interconnect media, wherein the plurality of link taps are centrally located and the designated ports can be connected to a particular I/O slot with a flexible interconnect media.

18. In an information handling system having a plurality of central processing units (CPUs), each having a plurality of designated ports for input/output (I/O) device interconnects, a method of connecting a CPU with an I/O device, the method comprising:
   identifying at least one of a computing bandwidth and a network bandwidth desired for interfacing with a PCIe-supported I/O device;
   selecting a port from the plurality of designated ports that is configured to provide the desired computing bandwidth and network bandwidth;
   selecting an I/O device that matches the identified desired computing bandwidth and network bandwidth, wherein the selected I/O device has a power consumption characteristic and a cooling requirement;
   selecting a location of an I/O slot in the information handling system that matches the physical size, power consumption characteristic and cooling requirement of the I/O device, based on cooling capabilities of the I/O slot locations, and that matches the identified required computing bandwidth and network bandwidth; and
   attaching a flexible interconnect media that connects the selected port to the selected I/O device, the flexible interconnect media connecting an open connection interface with an open link tap, the connection interface correlated and connected to an I/O slot at which the I/O device is received, whereby a connection between the CPU and the I/O device is completed via the flexible interconnect media extending between the connection interface and open link tap, wherein the connection between the I/O slot and the port is not hardwired into a PCB, the allocations of the port and the I/O slot are flexible, and a pairing of the I/O slot and a connection interface has electrical independence from the PCB; and wherein the correlated I/O slot is reserved for a target device having a desired bandwidth and an identified cooling requirement, wherein selecting a slot location for the target device includes matching device characteristics of physical size, power consumption, and a cooling requirement to corresponding requirements satisfied by the correlated I/O slot; and executing firmware on the CPU to enable the information handling system to complete the functions of:
  detecting a new I/O device coupled to an I/O slot during a start-up process of the information handling system;
  detecting an identification of the I/O slot and an identification of the flexible interconnect media;
  determining the I/O device that can be coupled to the I/O slot based on the identification of the I/O slot and the identification of the flexible interconnect media;
  determining power requirements and cooling requirements of the new I/O device, in part based on the identification of the I/O slot;
  identifying at least a power consumption characteristic and a cooling requirement for the detected I/O device;
  determining a cooling capability of the information handling system for the I/O slot based on the I/O device coupled to the slot and existing cooling devices of the IHS; and
  adjusting, using the BIOS/firmware and the existing cooling devices of the IHS that are adjustable to a cooling requirement of the I/O device coupled to the slot, the cooling capability for the I/O slot from the determined cooling capability based on the cooling requirement of the I/O device coupled to the slot.

* * * * *